United States Patent [19]

Artieri

[11] Patent Number: 5,193,203
[45] Date of Patent: Mar. 9, 1993

[54] SYSTEM FOR REARRANGING SEQUENTIAL DATA WORDS FROM AN INITIAL ORDER TO AN ARRIVAL ORDER IN A PREDETERMINED ORDER

[75] Inventor: Alain Artieri, Meylan, France

[73] Assignee: SGS-Thomson Microelectronics, S.A., Gentilly, France

[21] Appl. No.: 546,113

[22] Filed: Jul. 2, 1990

[30] Foreign Application Priority Data

Jul. 3, 1989 [FR] France ............... 89 09273

[51] Int. Cl.[5] ............................................. G06F 7/00
[52] U.S. Cl. ................................. 395/800; 364/259.5; 364/260.9; 364/DIG. 1
[58] Field of Search ... 364/200 MS File, 900 MS File; 395/775, 800

[56] References Cited

U.S. PATENT DOCUMENTS

| | | | |
|---|---|---|---|
| 3,781,822 | 12/1973 | Ahamed | 364/900 |
| 3,988,601 | 10/1976 | Perry | 235/92 |
| 4,181,976 | 1/1980 | Collins et al. | 364/900 |
| 4,303,986 | 12/1981 | Lans | 364/900 |
| 4,303,987 | 12/1981 | Haag et al. | 364/900 |
| 4,415,973 | 11/1983 | Evans | 364/200 |
| 4,499,555 | 2/1985 | Huang | 364/900 |
| 4,670,856 | 6/1987 | Nishino et al. | 395/425 |
| 4,914,574 | 4/1990 | Terada et al. | 364/200 |
| 4,914,625 | 4/1990 | Billian | 364/900 |
| 4,929,085 | 5/1990 | Kajihara | 364/518 |

FOREIGN PATENT DOCUMENTS

WO83/04116 11/1983 World Int. Prop. O. .

*Primary Examiner*—Lawrence E. Anderson
*Assistant Examiner*—Ayni Mohamed
*Attorney, Agent, or Firm*—Lowe, Price, LeBlanc & Becker

[57] ABSTRACT

A data shuffler of the pipeline type receives successive trains of n sequential data words and rearranges data words in each train according to a predetermined order. It comprises p ($p \leq n$) elementary processing units arranged in series. Each unit comprises an input, an output, a one-word storage register (20), a steering means (21) in order, in response to a binary control, to connect the input to the output either directly or through the register; and means for periodically supplying to each of the p steering means a sequence of n control bits determined as a function of said predetermined order.

4 Claims, 4 Drawing Sheets

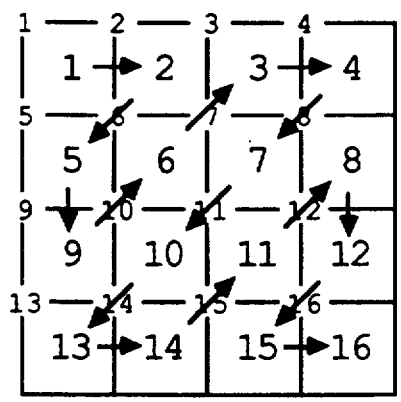
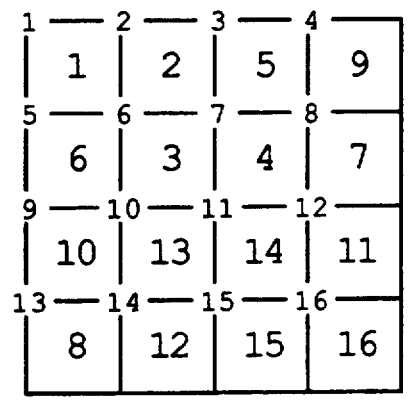
Figure 1A      Figure 1B
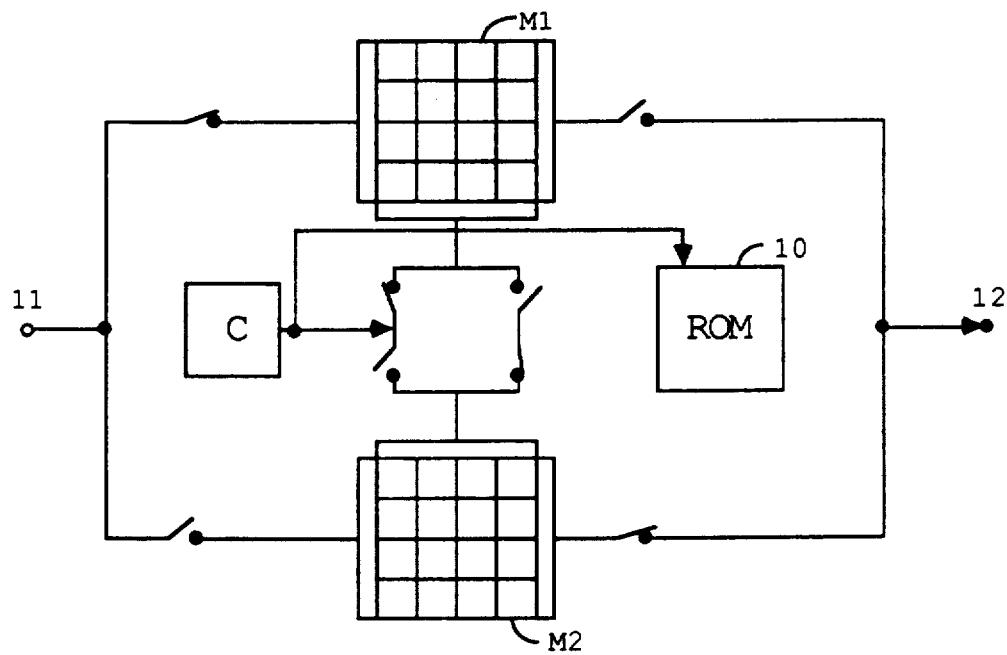
Figure 2
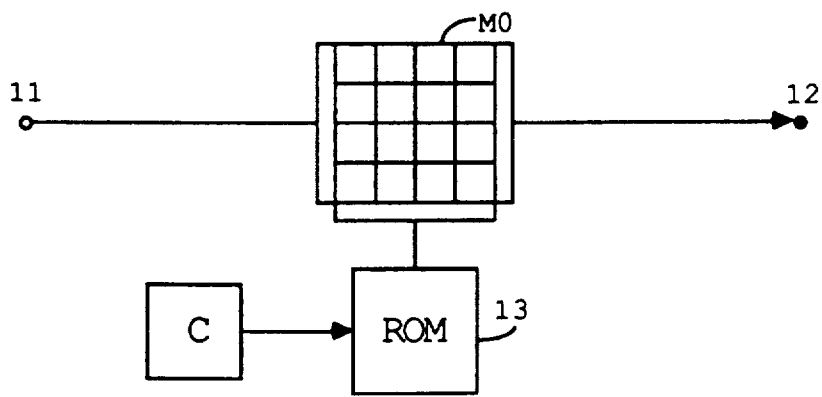
Figure 3

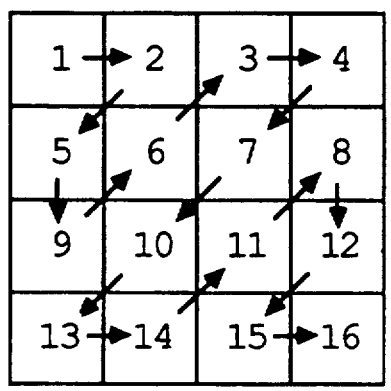
Figure 4A
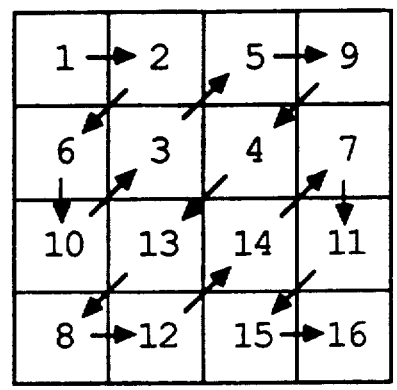
Figure 4B
| 1 | 2 | 6 | 10 |
|---|---|---|---|
| 3 | 5 | 9 | 4 |
| 13 | 8 | 12 | 14 |
| 7 | 11 | 15 | 16 |
Figure 4C
| 1 | 2 | 3 | 13 |
|---|---|---|---|
| 5 | 6 | 10 | 9 |
| 8 | 7 | 11 | 12 |
| 4 | 14 | 15 | 16 |
Figure 4D
| 1 | 2 | 5 | 8 |
|---|---|---|---|
| 6 | 3 | 13 | 10 |
| 7 | 4 | 14 | 11 |
| 9 | 12 | 15 | 16 |
Figure 4E
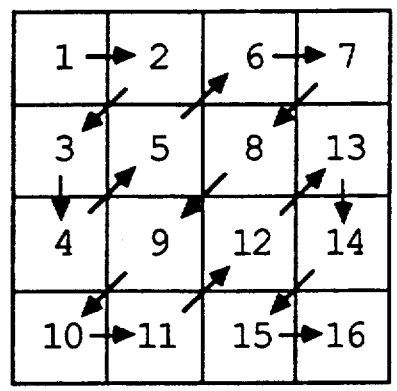
Figure 4F

SYSTEM FOR REARRANGING SEQUENTIAL DATA WORDS FROM AN INITIAL ORDER TO AN ARRIVAL ORDER IN A PREDETERMINED ORDER

BACKGROUND OF THE INVENTION

The present invention relates to a data shuffler, that is, a circuit receiving a train of data and supplying at the output the same data arranged in a different and predetermined order.

Numerous applications, especially in the field of picture processing, require the use of operators or circuits capable of changing the order of a series of data according to a predetermined sequence.

An example of such an application is the calculation of the two-dimensional transform, such as discrete cosine transform, of an image block in a TV image where this shuffling problem occurs several times:

data shuffling for calculating the monodimensional transform, matrix transposition, conversion of the coefficient matrix scanning into a zigzag scanning.

Another application is the ciphering of a video signal through pixel mixing.

Hereinafter the state of the art and the invention will be described in the particular case it is desired to carry out zigzag scanning of a data block. However, it will be noted that it is only a specific case of the invention which is described in detail to make the invention better understood.

FIGS. 1A and 1B illustrate a zigzag scanning process. Considering a series of data, for example 16 data such as shown in FIG. 1A in the form of a 4×4 image block, zigzag scanning consists in reading those data according to successive diagonals, that is, as illustrated in FIG. 1B, in the following order:

1, 2, 5, 9, 6, 3, 4, 7, 10, 13, 14, 11, 8, 12, 15, 16.

The most conventional method for carrying out such a data shuffling consists in using a circuit of the type illustrated in FIG. 2. This circuit comprises two random access memories (RAM) M1 and M2 each of which having the size of the train or block of data that it is desired to shuffle. Each of those memories is addressable either in the natural order of FIG. 1A through a counter C or in the order corresponding to a stored sequence in a ROM 10, the content of which corresponds to the drawing of FIG. 1B for a zigzag scanning.

Each train or block of data arriving on an input 11 is written in one of the memories according to natural order while the other memory is read according to zigzag order towards an output 12. During the next step, the data are entered in the memory which has just been read while the memory in which the data have just been written is read.

This method requires a memory capacity of two data trains or blocks in the RAMs M1 and M2 and a sequence of address words in ROM 10.

By way of example, considering 4×4 blocks and 12bits words, the memory capacity of the RAMs will have to be 32 words of 12 bits (384 bits) and the memory capacity of ROM 10 will be 16 words of 4 bits (64 bits), that is, a total memory capacity of 448 bits.

In case of 64-words blocks (8×8), it is necessary to provide for a RAM of 128 (2×64) words of 12 bits (1536 bits) and a ROM having a capacity of 64 words of 6 bits (384 bits), that is, a total memory capacity of 1920 bits.

In order to reduce the required memory capacity, it has been devised to use the simplified diagram illustrated in FIG. 3 comprising one RAM memory MO, the memory capacity of which is equal to the size of the incoming data block, that it is desired to transform, receiving the data trains on an input 11 and supplying them in a determined order on an output 12. This memory MO is addressed by a ROM 13 controlled by a counter C.

Initially, memory MO is filled with the first block of data normally arranged according to the order from 1 to 16. For the next data block, the ROM determines the addressing according to a determined order. Each time a datum is read at a specified address, a datum from the incoming train is simultaneously written at the place that has just been read. This architecture permits to divide by two the RAM memory capacity and to simplify the address circuits since the reading/writing operations are sequentially carried out in the same case without readdressing. However, it is necessary to provide for an increased capacity of ROM 13 for supplying the sequential addresses required for processing the successive data blocks. This structure has been used when the data shuffling corresponds to a matrix transposition (symmetry with respect to a diagonal). Indeed, this operation is involutive, that is, after two transpositions the initial order occurs again. Therefore, it is only necessary to store one address sequence in ROM 13.

But, the operation is more complex in case of zigzag scanning as illustrated in FIGS. 4A–4F for 4×4 data blocks. The first address sequence, corresponding to natural order, is illustrated in FIG. 4A. The next address sequence is illustrated in FIG. 4B where it can be appreciated that the third address corresponds to case 5 and the fourth one to case 9. The table of FIG. 4B is obtained by following the arrows represented in FIG. 4A. For the next data block, following the same zigzag sequence as the one which permits to pass from FIG. 4A to FIG. 4B and by applying this sequence to FIG. 4B, it can be seen that the successive order will be 1, 2, 6, 10 . . . (FIG. 4C). One similarly passes from each figure to the next one. Considering FIG. 4F, it will be seen that by applying a zigzag scanning to the data that are stored therein, the natural sequence of FIG. 4A is obtained again. Therefore, it is necessary to provide for six address cycles in the ROM to be able to convert again, according to a zigzag order, the successive data trains.

Considering the same digital data as above, for 4×4 blocks of 12-bits data, it will therefore be necessary to provide for a 16-words RAM capacity of 12 bits (192 bits) and a 4-bits ROM capacity of 6×16 address words (384 bits), that is, a total memory capacity of 576 bits.

In case of a zigzag scanning of 8×8 blocks, it will be necessary to carry out one after the other 136 different sequences before obtaining again the initial sequence which requires a storage ROM of 8704 (136×64) 6-bits words, that is, 51 kbits, to which are to be added the 64 words of 12 bits of the RAM. Therefore, it is clear that in this case the initial two-RAMs approach such as illustrated in FIG. 2 is far more economical than the one-RAM approach such as illustrated in FIG. 3.

Moreover, in the very schematic FIGS. 2 and 3, various decoders, which are necessarily associated with the storage ROM and are not represented, also necessitate a non negligible silicon surface area.

Another drawback of the prior art data shufflers is that the manufacture of memory structures is unavoidably delicate and involves to provide for sorting and testing steps to check that none of the memory points is faulty.

A further drawbacks of the prior art structures is that the process for using the described shufflers requires initial filling of a full memory block. Therefore, the latency time is equal to the duration of the initial filling of a complete memory, that is, to the duration for introducing all the words of a data train.

An object of the invention is to provide for a data shuffler palliating the drawbacks of the two above prior art circuits and more specifically:

decreasing the necessary silicon surface,
increasing the reliability of the system,
reducing latency time.

SUMMARY OF THE INVENTION

To achieve those objects and others, the invention provides for a pipeline-type data shuffler receiving successive trains of n sequential data words and rearranging in each train the data words according to a predetermined order, comprising:

p (p≦n) elementary processing units arranged in series, each unit comprising an input, an output, a one-word storage register, and a steering means in order, in response to a binary control, to connect the input to the output either directly or through the register; and means for periodically supplying to each of the p steering means a sequence of n control bits determined as a function of said predetermined order.

Thus, the invention completely avoids the use of RAM memories and uses only individual one-word data registers which are a priori much more reliable devices than memories. In addition, it will be noted that the circuit according to the invention operates in pipeline mode, that is, reduces latency time as much as possible.

BRIEF DISCLOSURE OF THE DRAWINGS

The foregoing and other objects, features and advantages of the invention will be apparent from the following detailed description of preferred embodiments as illustrated in the accompanying figures wherein:

FIGS. 1A and 1B are tables illustrating a zigzag-type scanning;

FIG. 2 shows a first data shuffler according to the prior art;

FIG. 3 shows a second data shuffler according to the prior art;

FIGS. 4A, 4B, 4C, 4D, 4E and 4F show successive addressing steps associated with the circuit of FIG. 3;

DESCRIPTION OF A PREFERRED EMBODIMENT

Figure 5:
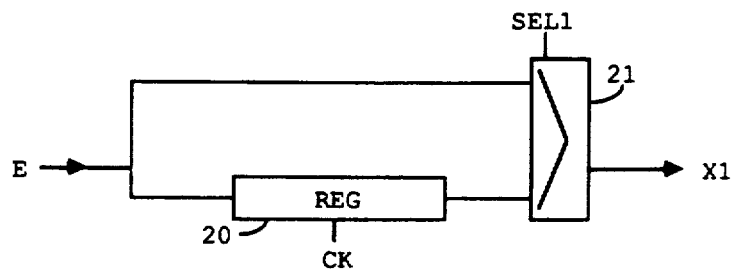
FIG. 5 illustrates an elementary processing unit according to the invention.

The invention provides for a circuit permitting to sequentially rearrange a data train from a determined initial order to a determined arrival order through successive iterations carried out in successive elementary units.

More specifically, considering zigzag scanning, the initial order is the natural order going from 1 to 16 and the arrival order is the above-indicated order 1, 2, 5, 9, 6 ... 15, 16. If E is the input sequence and S the output sequence, it will be possible to use, to pass from E to S, a so-called bubble sorting algorithm, that is, for each datum in a first series, the arrival series is observed to see if this datum is before or after the next datum. If the datum is before, it remains in place; if it is after, it is shifted until a datum is arranged after in the arrival series. Thus, to pass from series E to series S, the intermediate series X1-X4 illustrated in the following table are passed.

| E | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| $X_1$ | 1 | 2 | 3 | 5 | 6 | 4 | 7 | 9 | 10 | 11 | 8 | 13 | 14 | 12 | 15 | 16 |
| $X_2$ | 1 | 2 | 5 | 6 | 3 | 4 | 9 | 7 | 10 | 11 | 13 | 14 | 8 | 12 | 15 | 16 |
| $X_3$ | 1 | 2 | 5 | 6 | 3 | 9 | 4 | 7 | 10 | 13 | 14 | 11 | 8 | 12 | 15 | 16 |
| $X_4$ | 1 | 2 | 5 | 6 | 9 | 3 | 4 | 7 | 10 | 13 | 14 | 11 | 8 | 12 | 15 | 16 |
| S | 1 | 2 | 5 | 9 | 6 | 3 | 4 | 7 | 10 | 13 | 14 | 11 | 8 | 12 | 15 | 16 |

More specifically, series $X_1$ is obtained from the initial series E as follows.

Elements 1 and 2 of the initial series are in this order in the arrival series. Therefore, they are not shifted. Similarly, element 3 is in series S before element 4; therefore, it remains in place. But, element 4 is in series S after element 5; therefore it is interchanged with element 5. In the same way, it is after element 6 and is therefore interchanged with element 6. But this element 4 is before element 7; therefore it remains in place, followed by element 7, and so on. The next element is element 7. Element 8 comes after 9, 10, 11 in the arrival order but before 12; the following elements are therefore 9, 10, 11, 8. Element 12 comes after 13 and 14 in the arrival order but before 15; the following elements therefore are 13, 14, 12. Lastly, come 15 and 16 which are in this order in the arrival series.

Therefore, through successive iterations it is possible to pass from series E to series S. In the specific case considered, four intermediate steps $X_1$, $X_2$, $X_3$ and $X_4$ are to be provided for with the described algorithm.

FIG. 5 represents an elementary processing unit permitting to implement bubble sorting algorithm as above described for passing from a series to the next series. E designates the input of this unit and $X_1$ its output. This unit comprises a register 20 actuated at the rate of a clock CK corresponding to the introduction rate of the data and a selection circuit 21 actuated through a signal SEL1.

Figure 6:
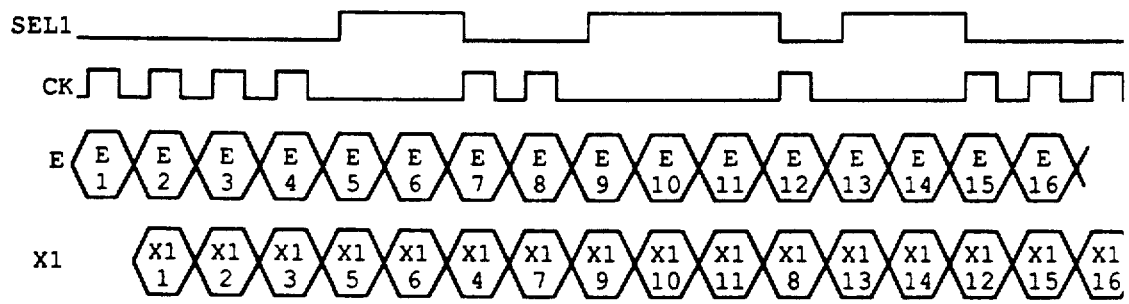
FIG. 6 is a time diagram illustrating the operation of the elementary unit of FIG. 5 for a specific sequence of selection control bits.

FIG. 6 illustrates a time diagram designed to explain the operation of the circuit of FIG. 5. The signal SEL1 is a binary signal, corresponding for example to an element of a succession of zeros and ones stored in a ROM. When the signal SEL1 is at a low level, the register is actuated and its output is connected to output $X_1$. When the signal SEL1 is at a high level, the input E is directly connected to the output $X_1$, no shifting being applied to the register. The last two lines of FIG. 6 represent signals E and $X_1$, signal $X_1$ being shifted with respect to the signal E by a clock interval. In signal $X_1$, the above described series $X_1$ is effectively obtained.

Figure 7:
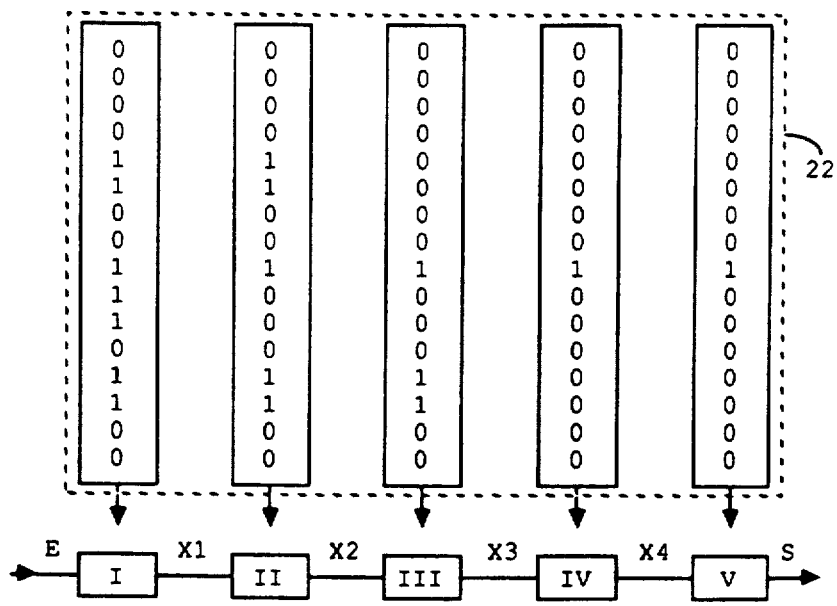
FIG. 7 shows a shuffler according to the invention.

In order to pass from E to S, it is possible to use, as illustrated in FIG. 7, a sequence of units I-V, each of which corresponds to a unit of FIG. 5. Those units are controlled by series of zeros and ones stored in the columns of a ROM 22 comprising as many columns as units and as many lines as data words in a train or block to be shuffled. Since there are five units in the case described, the output will be shifted by five clock intervals with respect to the input. That is, the latency time of the circuit according to the invention is then 5 whereas it was equal to the number of elements of the train of data to be shuffled, that is, 16, for the prior art circuits.

Figure 8:
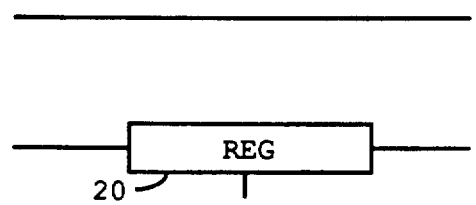
FIG. 8 illustrates a variant of the elementary unit according to the invention.
Figure 9:
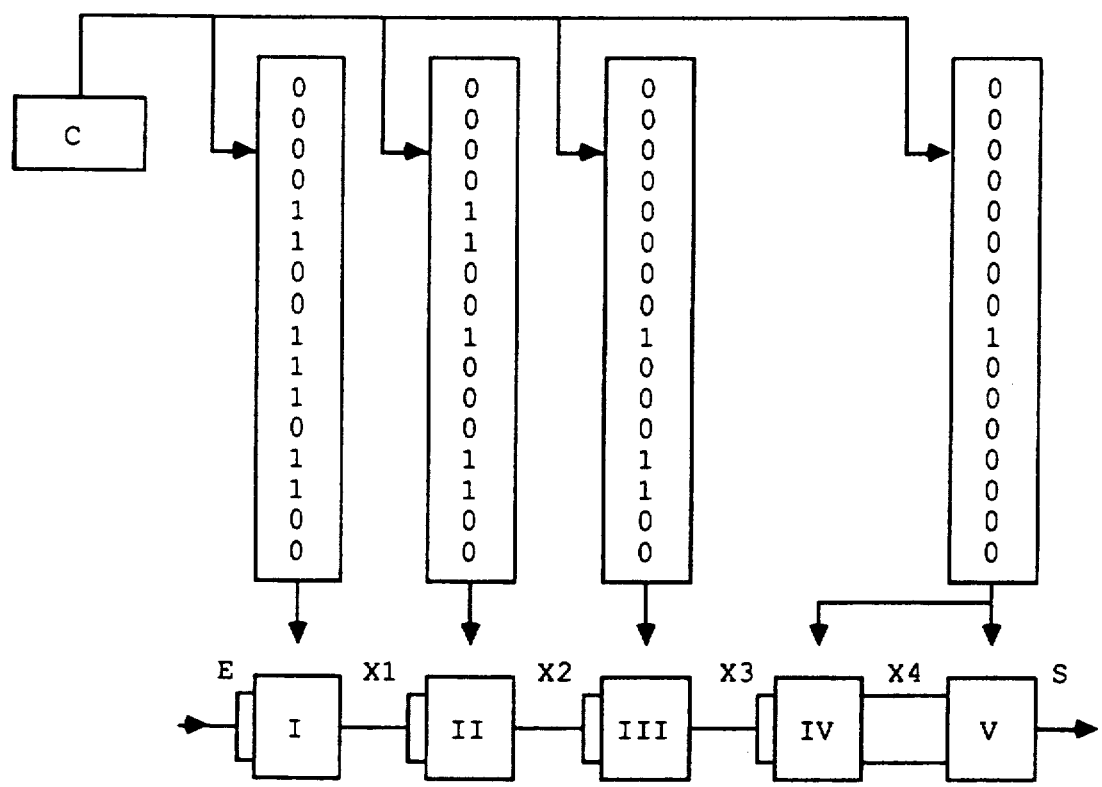
FIG. 9 shows a data shuffler according to the invention using the variant of FIG. 8.

On the other hand, it happens that in practice there often are several series of identical control orders for successive units (the last two ones in case of FIG. 7). Therefore, it is possible to use simplified elementary units such as the one represented in FIG. 8, the registers of those units being controlled by the same clock as the registers of identical units of the same subgroup. Therefore, FIG. 9 illustrates a variant of FIG. 7 wherein a unit of the type shown in FIG. 8 is substituted for unit IV. The two inputs of this unit are interconnected and its two outputs are directed towards the two non-interconnected inputs of a unit of the type shown in FIG. 5.

Therefore, it can be appreciated that in practice, the ROM memory designed to store the selection control bits has a more reduced size than the above represented size.

Latency time remains 5, as previously since there are 5 units but the critical transit time of data is reduced since a selection circuit has been suppressed.

With a circuit according to the invention, for 16-data blocks, one will use only 5 one-word registers and one ROM comprising four times 16 bits. For $8 \times 8$ blocks, it is necessary to provide for 27 registers and it is shown that due to optimization using simplified circuits such as the one of FIG. 8, one uses 15 selectors only, that is, it is necessary to store only 15 times 64 bits ($64 = 8 \times 8$ being the number of words in the series that it is desired to shuffle). The ROM storage capacity is therefore 15 times $64 = 960$ bits to which have to be added 27 registers of a 12-bits word each. Those values are to be compared with the 1920 memory bits of the prior art using two RAMs and with the 51 kbits of the prior art using one RAM.

Therefore, the invention permits to obtain a shuffling substantially reducing the number of necessary memory cases, but in addition it uses registers which are particularly reliable components and a low capacity ROM.

The invention has been described only in the specific case of zigzag shuffling. More generally, it can be applied to any chosen data shuffling. It is only for very simple shuffling, such as simple matrix transpositions that the devices of the prior art may exhibit an equivalent simplicity.

A further advantage of the invention is that, for a given shuffling operation, if it is desired to carry out an inverse shuffling operation (for example to pass from the zigzag scanning to a linear scanning), the same optimized structure such as the one described in FIG. 9 permits with a different content of the control ROMs to make the inverse operation. Moreover, the new ROM content is the same as the first one, with only line interchanges. Thus, instead of providing for a second ROM, it will be possible, by modifying the pointer progression of a single ROM in a determined way, to use the same control bit memory.

Moreover, while the control bits stored in a ROM have been described above, it is possible to use any other means for sending a predetermined series of control bits, for example programmable logic arrays (PLA).

I claim:

1. A pipeline data shuffler receiving successive trains of sequential data words, and rearranging said sequential data words in each said train according to a predetermined order comprising:
    a plurality of elementary processing units arranged and connected in series, each said elementary processing unit comprising:
    an input;
    an output;
    a one-word storage register for temporarily storing one of said data words receiving from said input;
    steering means for controlling the elementary processing unit to connect the input to the output through the register for temporarily storing the data word in response to a first level of a control signal and for connecting the input directly to the output thereby bypassing the register in response to a second level of the control signal; and
    means, coupled to each said elementary processing unit, for periodically and concurrently supplying to each of the steering means of each said elementary processing unit a sequence of said control signals based upon a number of sequential data words in said each train and determined as a function of said predetermined order to rearrange the sequential data words.

2. A data shuffler according to claim 1, wherein, when successive elementary units are controlled by identical sequences, the steering means which separate them are suppressed.

3. A data shuffler according to claim 1, wherein a number of the elementary processing units is not more than a number of the sequential data words in each of the successive trains.

4. A data shuffler according to claim 1, wherein a number of the control signals is equal to a number of the sequential data words in each of the successive trains.

* * * * *